United States Patent [19]

Schmidt

[11] Patent Number: 4,589,125

[45] Date of Patent: May 13, 1986

[54] CASSETTE FOR PHOTOSENSITIVE MATERIAL WITH MAGNETIC MEMBERS

[75] Inventor: Manfred Schmidt, Kirchheim, Fed. Rep. of Germany

[73] Assignee: Agfa-Gevaert Aktiengesellschaft, Leverkusen, Fed. Rep. of Germany

[21] Appl. No.: 522,114

[22] Filed: Aug. 10, 1983

[30] Foreign Application Priority Data

Aug. 14, 1982 [DE] Fed. Rep. of Germany ....... 3230288

[51] Int. Cl.[4] .............................................. G03B 42/04

[52] U.S. Cl. .................................... 378/187; 378/185; 250/482.1

[58] Field of Search ............................... 378/187, 185; 250/482.1

[56] References Cited

U.S. PATENT DOCUMENTS

| | | | |
|---|---|---|---|
| 3,704,369 | 11/1972 | Paidosh | 378/187 |
| 4,418,420 | 11/1983 | Bauer et al. | 378/187 |
| 4,438,164 | 3/1984 | Pfeifer et al. | 378/187 |

*Primary Examiner*—Richard L. Schilling

*Attorney, Agent, or Firm*—Peter K. Kontler

[57] ABSTRACT

A cassette for X-ray film has a cover and a bottom which can be moved apart to open the cassette and insert a sheet of X-ray film and can be moved together to close the cassette and define a light-tight compartment for the film. A magnetic foil is secured to the bottom of the cassette and an intensifying screen overlies the magnetic foil. The cover carries a resilient border which, in turn, carries a synthetic resin foil. A magnetic sheet is secured to the synthetic resin foil and a second synthetic resin foil is secured to the side of the magnetic sheet remote from the first synthetic resin foil. A second intensifying screen is attached to the second synthetic resin foil. When a sheet of film is accommodated in the cassette and the latter is closed, the intensifying screens are located on opposite sides of the film. The magnetic sheet and magnetic foil are attracted to one another thereby urging the intensifying screens into uniform contact with the film. The synthetic resin foils have the same or approximately the same coefficient of thermal expansion as the intensifying screens. This enables the synthetic resin foils to expand and contract in the same manner as the intensifying screens when the cassette is subjected to temperature fluctuations. The magnetic sheet sandwiched between the synthetic resin foils is elastically deformable so that it can follow the expansions and contractions of the synthetic resin foils. Accordingly, warpage of the magnetic sheet is prevented thereby permitting a uniform pressure to be exerted on the film.

14 Claims, 4 Drawing Figures

CASSETTE FOR PHOTOSENSITIVE MATERIAL WITH MAGNETIC MEMBERS

BACKGROUND OF THE INVENTION

The invention relates generally to a cassette for photosensitive material.

More particularly, the invention relates to a cassette for X-ray film.

A known cassette for X-ray film has a bottom portion and a cover which are movable between an open position and a closed position. In the closed position, the bottom portion and the cover cooperate to define a closed compartment for a sheet of X-ray film. Locking elements are provided to arrest the bottom portion and the cover in the closed position. The cassette includes a pair of magnetic sheets as well as an intensifying screen which is located between the magnetic sheets in the closed position of the cassette. The intensifying screen is designed to be located adjacent a sheet of film which is accommodated in the cassette. The magnetic sheets generate a magnetic force of sufficient magnitude to press the intensifying screen into firm engagement with the film. At least one of the magnetic sheets is flexible and such sheet has a size which is at least approximately the same as that of the film. The magnetic sheet which cooperates with the flexible sheet is generally in the form of a steel foil.

It has been found that the conventional flexible magnetic sheets tend to develop ridges when subjected to temperature changes. This is due to the fact that the coefficient of thermal expansion of a flexible magnetic sheet differs from that of the carrier material which serves as a support or matrix for the fluorescent material of the intensifying screen. The tendency of the flexible magnetic sheet to develop ridges presents a problem since it affects the ability of the magnetic sheet to exert a uniform force over the entire area of the film.

OBJECTS AND SUMMARY OF THE INVENTION

It is an object of the invention to compensate for differential expansion and/or contraction of an intensifying element and a magnetic element.

Another object of the invention is to provide a cassette for photosensitive material which is designed in such a manner that relative expansion and/or contraction of an intensifying element and a magnetic element is reduced.

An additional object of the invention is to provide a cassette of the type described above which is designed in such a manner that a photosensitive material may be pressed against an intensifying element with a substantially uniform force.

The preceding objects, as well as others which will become apparent as the description proceeds, are achieved by the invention.

One aspect of the invention resides in a cassette for photosensitive material, particularly X-ray film, which comprises a pair of cooperating members movable between an open position and a closed position in which the members define a closed compartment for photosensitive material. An intensifying element is provided and includes a carrier material and an intensifying material. A pair of magnetic elements is arranged to be located on opposite sides of the intensifying element in the closed position of the cassette. At least one of the magnetic elements is elastically deformable. A compensating element is mounted on the elastically deformable magnetic element and has a coefficient of thermal expansion which at least approximates that of the carrier material constituting part of the intensifying element.

In accordance with the invention, expansion and/or contraction of the elastically deformable magnetic element is equal or almost equal to that of the intensifying element. Relative shifting of the elastically deformable magnetic element and the intensifying element is entirely or almost entirely avoided.

Moreover, by mounting a compensating element on the elastically deformable magnetic element, the invention causes the latter to be stiffened or strengthened. This facilitates mounting of the elastically deformable magnetic element and leads to dimensional stability.

With conventional magnetic sheets, there is the danger that particles will become loosened from the surface of the sheet after a period of use. In some cases, these particles can cause contamination which results in a reduction in quality. According to the invention, such loosening of particles may be prevented by the compensating element which is mounted on the elastically deformable magnetic element.

The novel features which are considered as characteristic of the invention are set forth in particular in the appended claims. The improved cassette itself, however, both as to its construction and its mode of operation, together with additional features and advantages thereof, will be best understood upon perusal of the following detailed description of certain specific embodiments with reference to the accompanying drawings.

DESCRIPTION OF THE PREFERRED EMBODIMENTS

Figure 1:
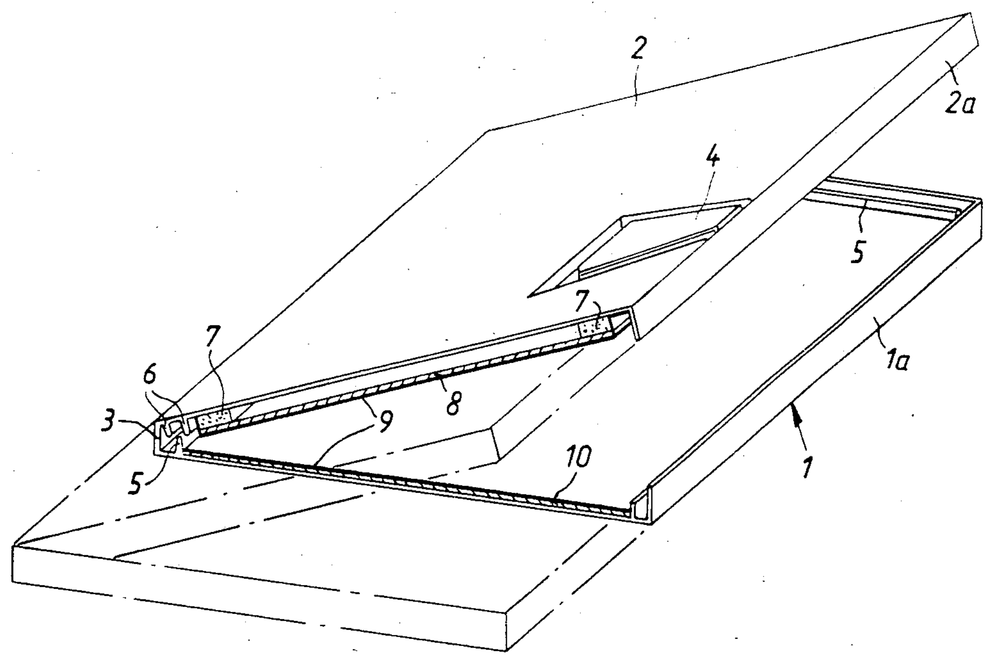
FIG. 1 is a perspective view of a cassette for X-ray film which is constructed in accordance with-the prior art.

FIG. 1 illustrates a cassette for X-ray film which is constructed in accordance with the prior art. The cassette includes a bottom portion or member 1 and a cover or upper member 2. The bottom portion 1 and cover 2 are connected by a hinge 3 which may be composed of a synthetic resin. The bottom portion 1 and cover 2 are movable between an open position such as illustrated and a closed position in which they cooperate to define a closed compartment for a sheet of X-ray film. An actuating element 4 is recessed into the cover 2 and operates one or more non-illustrated locking elements which serve to arrest the bottom portion 1 and the cover 2 in the closed position.

It is possible to eliminate the hinge 3 so that the bottom portion 1 and the cover 2 are not permanently connected with one another. In such a case, the cover 2 is placed over the bottom portion 1 in an inverted position when the cassette is to be closed in much the same manner as the cover of a box is used to close the box. The bottom portion 1 and the cover 2 are then locked to one another by locking elements provided at two or more sides of the cassette. Many other modes of connecting the bottom portion 1 and the cover 2 with one another exist.

The bottom portion 1, which is rectangular, has an upwardly extending rim 1*a* at its periphery. The rim 1*a* runs along three sides of the bottom portion 1, namely, the two sides which are perpendicular to the hinge 3 and the side which is remote from and parallel to the hinge 3. The bottom portion 1 is further provided with an upwardly projecting lip 5 which extends along all four sides of the bottom portion 1. The lip 5 is located slightly inwardly of the rim 1*a* and defines a gap with the latter. The lip 5 bounds a rectangular area having a size which is essentially equal to that of a sheet of X-ray film to be accommodated in the cassette.

The cover 2 is rectangular like the bottom portion 1. The cover 2 is provided with a downwardly projecting rim 2*a* along three of its sides, namely, the two sides which are perpendicular to the hinge 3 and the side which is remote from and parallel to the hinge 3. At its fourth side, the cover 2 has a pair of downwardly projecting, parallel lips 6. In the closed position of the cassette, the lips 6 flank that portion of the lip 5 which is adjacent to the hinge 3 while the rim 2*a* is received in the gap defined by the rim 1*a* and the remainder of the lip 5. The lips 5, 6 and rims 1*a*, 2*a* prevent light from entering the film compartment defined by the bottom portion 1 and the cover 2.

A resilient border 7 of foamed material is mounted on the inner surface of the cover 2 and runs along all four sides of the latter. The border 7 carries a magnetic sheet 8 which has the same or approximately the same size as the film compartment defined by the bottom portion 1 and the cover 2, that is, the rectangular area bounded by the lip 5. The magnetic sheet 8 may, for example, be adhesively secured to the border 7. The magnetic sheet 8, which may be rigid or flexible, may be composed of a variety of materials. Examples are Alnico alloys; oxidic permanent magnetic materials such as Fe-Co oxides and Ba or Sr ferrites; polyvinylchloride foils coated with a magnetic substance; and injection molded magnetic materials consisting of a mixture of a powdered oxide, e.g. a ceramic substance such as iron oxide or barium oxide, and a binding agent.

A foil or sheet 10 which is designed to cooperate with the magnetic sheet 8 in the closed position of the cassette is secured, e.g. adhesively, to the bottom portion 1. The foil 10 comprises any substance which will be attracted by the magnetic field of the magnetic sheet 8. In other words, the foil 10 is magnetic also. The foil 10 may, for instance, be in the form of a very thin steel foil. Such a steel foil may have a thickness of 0.05 mm although a thickness of 0.02 mm is preferred. The magnetic foil 10 may also take other forms. By way of example, the magnetic foil 10 may be in the form of cardboard which is coated with iron particles or in the form of a plastic matrix which binds ferrite powder or the like. Although the material for the magnetic foil 10 may be selected largely at will, the magnetic foil 10 should be designed so that the absorption of X-rays thereby is minimized. The dimensions of the magnetic foil 10 are the same or approximately the same as those of the film compartment.

The cassette further includes a pair of intensifying screens or sheets 9. Although two intensifying screens 9 are illustrated, a single intensifying screen may be used. The sizes of the intensifying screens 9 are the same or approximately the same as the size of the film compartment. The intensifying screens 9 are arranged to be located on opposite sides of a sheet of film accommodated in the cassette and, to this end, one of the intensifying screens 9 is associated with the magnetic sheet 8 while the other intensifying screen 9 is associated with the magnetic foil 10. Although the intensifying screens 9 may be loose, it is preferred for the respective intensifying screens 9 to be connected with the magnetic sheet 8 and the magnetic foil 10. This makes it easier to manipulate the cassette. When the cassette is in its open position and a sheet of film is to be inserted in the cassette, it is merely necessary to place the film in the cassette. After the film has been inserted in the cassette and the cassette closed, the film is sandwiched between the intensifying screens 9. Due to the sandwich arrangement of the magnetic sheet 8 and the magnetic foil 10, the intensifying screens 9 are urged towards one another. The magnetic field between the magnetic sheet 8 and the magnetic foil 10, which is responsible for urging the intensifying screens 9 towards one another, thus causes a uniform pressure to be exerted over the entire area of the film. Stated differently, the magnetic field urges the intensifying screens 9 into uniform and complete contact with the film. This is a primary criterion for obtaining an image of good quality on the film. It is therefore important that the magnetic force generated by the magnetic sheet 8 and the magnetic foil 10 be of sufficient magnitude to effect complete and uniform engagement between the intensifying screens 9 and the film. When the cassette is open, that is, when the cover 2 and the bottom portion 1 are moved away from one another, the magnetic sheet 8 and its associated intensifying screen 9 are displaced from the magnetic foil 10 and the associated intensifying screen 9 against the force of attraction between the magnetic sheet 8 and the magnetic foil 10.

Figure 2:
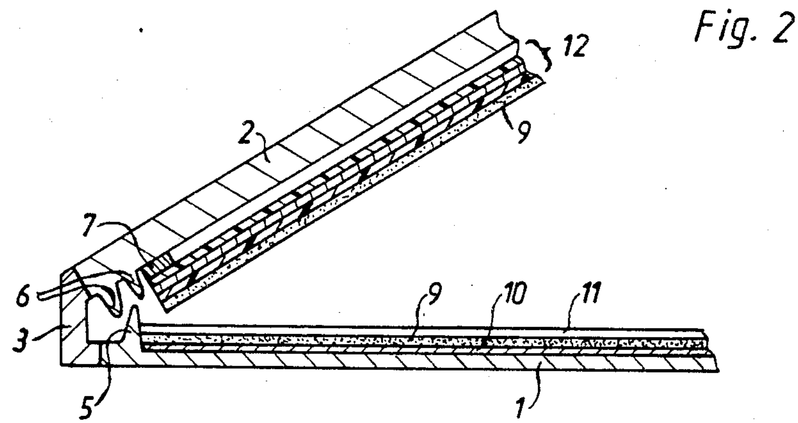
FIG. 2 is a cross-sectional view of a cassette for X-ray film constructed according to the invention.

FIG. 2 is a cross-sectional view of a cassette in accordance with the invention. The cassette of the invention has the same general construction as the cassettes of the prior art and the same reference numerals as in FIG. 1 are used to identify similar elements.

In FIG. 2, the magnetic foil 10 is again secured to the bottom portion 1 and, as before, carries an intensifying screen 9. A sheet 11 of X-ray film rests on the intensifying screen 9 associated with the magnetic foil 10.

An important difference between the cassette of the invention and those of the prior art resides in that the magnetic sheet 8 is replaced by a layered magnetic unit 12 which is likewise secured to the resilient border 7. The downwardly facing surface of the magnetic unit 12 carries an intensifying screen 9. The latter may be connected with the magnetic unit 12 by an adhesive or in any other suitable manner.

It is possible to provide a resilient border such as the border 7 on the bottom portion 1 also. The magnetic foil 10 would then be secured to this border so that, like the magnetic sheet 8 and the magnetic unit 12, it would be mounted in a floating fashion. In other words, the magnetic sheet 8, the magnetic unit 12 and the magnetic foil 10 can undergo limited movement in all directions when mounted on a resilient border such as the border 7.

Figure 3:
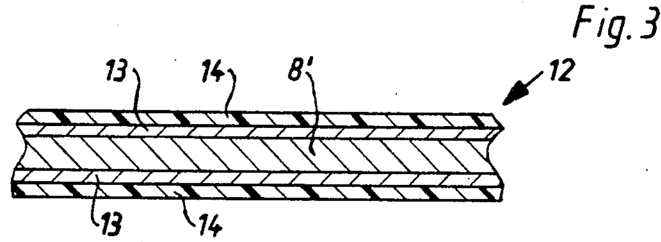
FIG. 3 is a cross-sectional view illustrating an embodiment of the invention in which a pair of compensating sheets are secured to opposite sides of a magnetic sheet.

FIG. 3 shows the magnetic unit 12 in greater detail. The magnetic unit 12 includes a magnetic sheet or element 8′ which is elastically deformable. An adhesive layer 13 is provided on each of the major surfaces of the magnetic sheet 8′. A compensating layer 14 which is preferably coextensive with the magnetic sheet 8′ is secured to each of the adhesive layer 13. The purpose of the compensating layer 14 is to compensate for the stresses to which the magnetic sheet 8′ is subjected when the intensifying screen 9 associated with the magnetic unit 12 undergoes expansion or contraction as a result of temperature fluctuations.

The intensifying screen 9 associated with the magnetic unit 12 in FIG. 2 comprises a carrier material or matrix having an intensifying or fluorescing material incorporated therein. In order that the compensating layers 14 may compensate for expansion and contraction of the intensifying screen 9, the compensating layers 14 have a coefficient of thermal expansion which is the same or approximately the same as that of the matrix of the intensifying screen 9. The matrix of the intensifying screen 9 may be composed of a synthetic resin and the compensating layers 14 may likewise be composed of a synthetic resin. Advantageously, the compensating layers 14 are composed of the same material as the matrix of the intensifying screen 9. It is preferred for the matrix of the intensifying screen 9 to be composed of a polyester. The compensating layers 14 may, for instance, have a thickness of the order of 50 micrometers.

In the embodiment of FIG. 3, the compensating layers 14 are adhesively secured to the magnetic sheet 8′. However, it is also possible to laminate the compensating layers 14 to the magnetic sheet 8′ in a roller laminating machine.

The magnetic sheet 8′ need not be provided with a compensating layer 14 on both sides thereof. Instead, it is possible to provide a compensating layer 14 only on that surface of the magnetic sheet 8′ which carries the intensifying screen 9. This may be desirable in small cassettes or where a cassette is to have a simplified construction.

When the cassette according to the invention is subjected to temperature fluctuations, the intensifying screen 9 attached to the magnetic unit 12 expands or contracts. Since the coefficient of thermal expansion of the compensating layers 14 is the same or approximately the same as that of the intensifying screen 9, the compensating layers 14 expand and contract in about the same manner as the intensifying screen 9. In other words, the compensating layers 14 follow the movements of the intensifying screen 9. As a result, the elastically deformable magnetic sheet 8′ which is secured to the compensating layers 14 likewise expands and contracts in accordance with the intensifying screen 9.

Figure 4:
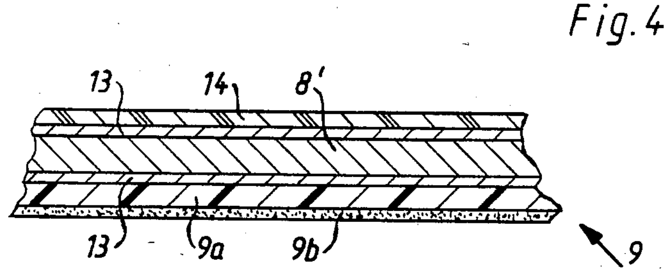
FIG. 4 is a cross-sectional view illustrating an embodiment of the invention in which a compensating sheet and an intensifying sheet are secured to opposite sides of a magnetic sheet.

In the embodiment of FIG. 4, the compensating layer 14 of FIG. 3 which engages the intensifying screen 9 is omitted. Here, the intensifying screen 9 comprises a carrier layer **9*a* and an intensifying or fluorescing layer 9*b*. The carrier layer 9*a* is composed of the same material as the matrix of the intensifying screen 9 of FIG. 2. The carrier layer 9*a* adheres to the adhesive layer 13 which, in FIG. 3, supports the compensating layer 14 in engagement with the intensifying screen 9. The coefficient of thermal expansion of the carrier layer 9*a* is the same or approximately the same as that of the compensating layer 14 located on the opposite side of the magnetic sheet 8′. The carrier layer 9*a* serves a function similar to that of the compensating layer 14 which it replaces. When the cassette is closed, the intensifying layer 9*b* contacts the film 11**.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A cassette for photosensitive material, particularly X-ray film, comprising:

(a) a pair of cooperating members movable between an open position, and a closed position in which said members define a closed compartment for photosensitive material, one of said members constituting a bottom and the other of said members constituting a cover of said cassette;

(b) a pair of sheet-like intensifying elements each including a carrier material and an intensifying material;

(c) a pair of sheet-like magnetic elements arranged to sandwich said intensifying elements in said closed position, at least one of said magnetic elements being elastically deformable, and said one magnetic element and one of said intensifying elements being mounted on one of said members, the other magnetic element and the other intensifying element being mounted on the other member, and said magnetic elements being designed to generate a magnetic force in said closed position which is sufficient to urge said intensifying elements into substantially full contact with photosensitive material sandwiched between the same; and (d) a sheet-like compensating element mounted on said one magnetic element and having a coefficient of thermal expansion which at least approximates that of the carrier material of said one intensifying element.

2. A cassette as defined in claim 1, comprising locking means for arresting said members in said closed position.

3. A cassette as defined in claim 1, wherein said one magnetic element has a pair of opposed major surfaces and said compensating element is secured to one of said major surfaces.

4. A cassette as defined in claim 1, wherein said compartment is designed to accommodate a sheet of photosensitive material.

5. A cassette as defined in claim 1, wherein the size of said one magnetic element at least approximates the size of said compartment.

6. A cassette as defined in claim 1, wherein said compensating element comprises a synthetic resin.

7. A cassette as defined in claim 6, wherein each carrier material comprises a synthetic resin.

8. A cassette as defined in claim 7, wherein said compensating element and both carrier materials comprise a polyester.

9. A cassette as defined in claim 1, wherein said compensating element and said one magnetic element are laminated to one another.

10. A cassette as defined in claim 1, wherein said compensating element is adhesively secured to said one magnetic element.

11. A cassette as defined in claim 1, said one magnetic element having a pair of opposed surfaces and said compensating element being mounted on one of said surfaces; and wherein said one intensifying element comprises a carrier layer which includes the carrier material and an intensifying layer which includes the intensifying material, said carrier layer being secured to the other of said surfaces.

12. A cassette as defined in claim 1, said one magnetic element and said compensating element having overlying major surfaces; and wherein said one magnetic element and said compensating element are bonded to one another over substantially the entire area of said major surfaces.

13. A cassette for photosensitive material, particularly X-ray film, comprising:

(a) a pair of cooperating members movable between an open position, and a closed position in which said members define a closed compartment for photosensitive material, one of said members constituting a bottom and the other of said members constituting a cover of said cassette;

(b) a sheet-like intensifying element including a carrier material and an intensifying material;

(c) a pair of sheet-like magnetic elements arranged to be located on opposite sides of said intensifying element in said closed position, at least one of said magnetic elements being elastically deformable, and said one magnetic element having a pair of opposed surfaces, said magnetic elements being designed to generate a magnetic force in said closed position which is sufficient to urge said intensifying element into substantially full contact with photosensitive material located adjacent to said intensifying element; and (d) a pair of sheet-like compensating elements each having a coefficient of thermal expansion which at least approximates that of said carrier material, one of said compensating elements being secured to one of said surfaces, and the other of said compensating elements being secured to the other of said surfaces.

14. A cassette as defined in claim 13, wherein said one magnetic element and said intensifying element are mounted on one of said cooperating members and the other of said magnetic elements is mounted on the other of said cooperating members.

* * * * *